United States Patent
Ito et al.

(10) Patent No.: US 12,482,904 B2
(45) Date of Patent: Nov. 25, 2025

(54) ELECTRICAL STORAGE DEVICE

(71) Applicant: SANYO Electric Co., Ltd., Osaka (JP)

(72) Inventors: Daisuke Ito, Hyogo (JP); Yukihiro Mizonobe, Hyogo (JP); Kensuke Watanabe, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 762 days.

(21) Appl. No.: 17/779,389

(22) PCT Filed: Nov. 12, 2020

(86) PCT No.: PCT/JP2020/042221
§ 371 (c)(1),
(2) Date: May 24, 2022

(87) PCT Pub. No.: WO2021/106594
PCT Pub. Date: Jun. 3, 2021

(65) Prior Publication Data
US 2022/0407191 A1    Dec. 22, 2022

(30) Foreign Application Priority Data
Nov. 29, 2019    (JP) ................. 2019-216054

(51) Int. Cl.
*H01M 50/531*    (2021.01)
*H01M 10/0525*    (2010.01)
(Continued)

(52) U.S. Cl.
CPC ..... *H01M 50/531* (2021.01); *H01M 10/0525* (2013.01); *H01M 50/107* (2021.01); *H01M 50/188* (2021.01); *H01M 50/547* (2021.01)

(58) Field of Classification Search
None
See application file for complete search history.

(56) References Cited

U.S. PATENT DOCUMENTS

2014/0109777 A1*  4/2014  Pantke ............ B29C 66/81427
                                                                100/99
2014/0113185 A1   4/2014  Mori et al.
(Continued)

FOREIGN PATENT DOCUMENTS

JP    2015-056257 A     3/2015
JP    2015-225736    * 12/2015   ............ H01M 10/04
(Continued)

OTHER PUBLICATIONS

Shear Modulus of Rigidity Table of Engineering Materials, Engineers Edge website, accessed at https://www.engineersedge.com/materials/shear_modulus_of_rigidity_13122.htm, publication date unknown, access date Feb. 2025 (Year: 2025).*

(Continued)

*Primary Examiner* — Amanda J Barrow
(74) *Attorney, Agent, or Firm* — CANTOR COLBURN LLP

(57) ABSTRACT

This electrical storage device comprises: an electrode body; a bottomed cylindrical outer can; a sealing plate to which a positive electrode terminal and a negative electrode terminal are attached; and a functional part placed near the positive electrode terminal or the negative electrode terminal on the inner surface of the sealing plate. The electrode body has a positive electrode tab group for which a plurality of positive electrode tabs are laminated, and a negative electrode tab group for which a plurality of negative electrode tabs are laminated, and each tab group functions as a spring that connects the electrode body and the sealing plate. Of the positive electrode tab group and the negative electrode tab group, the spring constant of one tab group near the functional part is greater than the spring constant of the other tab group.

6 Claims, 3 Drawing Sheets

(51) Int. Cl.
H01M 50/107 (2021.01)
H01M 50/188 (2021.01)
H01M 50/547 (2021.01)

(56) References Cited

U.S. PATENT DOCUMENTS

| | | | | |
|---|---|---|---|---|
| 2014/0134461 | A1* | 5/2014 | Inoue | H01M 10/6553 |
| | | | | 429/7 |
| 2015/0155528 | A1* | 6/2015 | Takahashi | H01M 50/105 |
| | | | | 429/163 |
| 2016/0329546 | A1* | 11/2016 | Ham | H01M 50/533 |
| 2017/0365839 | A1* | 12/2017 | Kawate | H01M 50/46 |
| 2018/0062146 | A1 | 3/2018 | Asano et al. | |
| 2018/0375162 | A1 | 12/2018 | Wakimoto et al. | |
| 2019/0120910 | A1* | 4/2019 | Ghantous | H01M 10/44 |
| 2019/0207252 | A1* | 7/2019 | Badding | H01M 4/0471 |
| 2019/0273241 | A1* | 9/2019 | Koop | H01M 50/571 |
| 2019/0348655 | A1* | 11/2019 | Kim | H01M 50/429 |

FOREIGN PATENT DOCUMENTS

| | | |
|---|---|---|
| JP | 2015-225736 A | 12/2015 |
| JP | 2017-045657 A | 3/2017 |
| JP | 2017-063044 A | 3/2017 |
| JP | 2018-014221 A | 1/2018 |
| JP | 2018-085215 A | 5/2018 |
| JP | 2018-200841 * | 12/2018 ............. H01M 2/26 |
| JP | 2018-200841 A | 12/2018 |
| JP | 2019-009015 A | 1/2019 |
| JP | 2019-114569 A | 7/2019 |

OTHER PUBLICATIONS

Indian Office Action dated Sep. 9, 2022 issued in the corresponding Indian Patent Application No. 202247030031, with English translation.

Extended European Search Report dated Nov. 6, 2023 issued in the corresponding European Patent Application No. 20892239.3.

International Search Report issued in International Patent Application No. PCT/JP2020/042221 dated Jan. 19, 2021, with English translation.

* cited by examiner

ELECTRICAL STORAGE DEVICE

CROSS-REFERENCE OF RELATED APPLICATIONS

This application is the U.S. National Phase under 35 U.S.C. § 371 of International Patent Application No. PCT/JP2020/042221, filed on Nov. 12, 2020, which in turn claims the benefit of Japanese Patent Application No. 2019-216054, filed on Nov. 29, 2019, the entire disclosures of which Applications are incorporated by reference herein.

TECHNICAL FIELD

The present disclosure generally relates to an electrical storage device, and more particularly to an electrical storage device comprising a functional component arranged close to a positive electrode terminal or a negative electrode terminal of a sealing plate.

BACKGROUND ART

There has been conventionally widely known an electrical storage device comprising a bottomed cylindrical outer can in which an electrode assembly is housed, and a sealing plate to which a positive electrode terminal and a negative electrode terminal are attached and that closes an opening of the outer can. For example, Patent Literature 1 discloses an electrical storage device comprising a positive electrode current collecting plate including a positive electrode terminal, a negative electrode current collecting plate including a negative electrode terminal, a positive electrode tab group formed by gathering positive electrode tabs, and a negative electrode tab group formed by gathering negative electrode tabs, in which the positive electrode tab group is welded to an upper surface of the positive electrode current collecting plate, and the negative electrode tab group is welded to an upper surface of the negative electrode current collecting plate. In the electrical storage device of Patent Literature 1, the lengths of the tabs forming the tab group are varied depending on the stacking position, thereby suppressing a variation in the electrical resistance in the current collecting part. In the electrical storage device of Patent Literature 1, each current collecting plate and the corresponding terminal are connected via an overcurrent protection circuit.

Patent Literature 2 discloses an electrical storage device comprising an electrode assembly consisting of two electrode groups each having a positive electrode tab group and a negative electrode tab group. Patent Literature 2 discloses that the tab group is welded to the current collecting plate in a state in which the tabs are gathered toward a center in the stacking direction of the electrode group, whereby a load acting on the tabs can be reduced.

CITATION LIST

Patent Literature

PATENT LITERATURE 1: Japanese Unexamined Patent Application Publication No. 2015-225736
PATENT LITERATURE 2: Japanese Unexamined Patent Application Publication No. 2018-200841

SUMMARY

A functional component comprising a current breaking mechanism for cutting off a current path when the abnormality occurs, for example, is generally provided in the electrical storage device such as a lithium ion battery. When vibration, impact or the other load is applied to such a functional component in the manufacture of the electrical storage device, for example, it is assumed that the performance of the functional component deteriorates. Meanwhile, if the manufacturing conditions are strictly regulated so that a load is not applied to the functional component, it leads to the decrease in the productivity.

An electrical storage device according to the present disclosure comprises an electrode assembly in which positive electrodes and negative electrodes are alternately stacked with separators each interposed between the positive electrode and the negative electrode, a bottomed cylindrical outer can in which the electrode assembly is housed, a sealing plate to which a positive electrode terminal and a negative electrode terminal are attached and that closes an opening of the outer can, and a functional component that is arranged close to the positive electrode terminal or the negative electrode terminal on an inner surface of the sealing plate, wherein the positive electrode includes a positive electrode tab to be electrically connected with the positive electrode terminal, the negative electrode includes a negative electrode tab to be electrically connected with the negative electrode terminal, the electrode assembly has a positive electrode tab group formed by stacking a plurality of the positive electrode tabs, and a negative electrode tab group formed by stacking a plurality of the negative electrode tabs, in which each of the tab groups functions as a spring for connecting the electrode assembly and the sealing plate, and a spring constant of one tab group close to the functional component, of the positive electrode tab group and the negative electrode tab group, is greater than a spring constant of the other tab group.

According to the present disclosure, the electrical storage device can prevent a great load from being applied to the functional component comprising the current breaking mechanism or the like provided in the device while ensuring good productivity. Accordingly, vibration or impact hardly acts on the functional component in the manufacture of the electrical storage device, for example, which makes it possible to prevent performance deterioration, damage, and the like of the functional component from being caused by the vibration or the impact. The functional component can be sufficiently protected from the vibration or the impact even when special manufacturing conditions are not added in a step of assembling the electrical storage device.

DESCRIPTION OF EMBODIMENTS

Hereinafter, an example of embodiments of the present disclosure will be described in detail with reference to the drawings. Note that it has been assumed from the outset that a plurality of embodiments and variants which are exemplified below can be selectively combined. In the present specification, notation of the "numerical value A to the numerical value B" means the "numerical value A or more and the numerical value B or less," unless otherwise specified.

Figure 1:
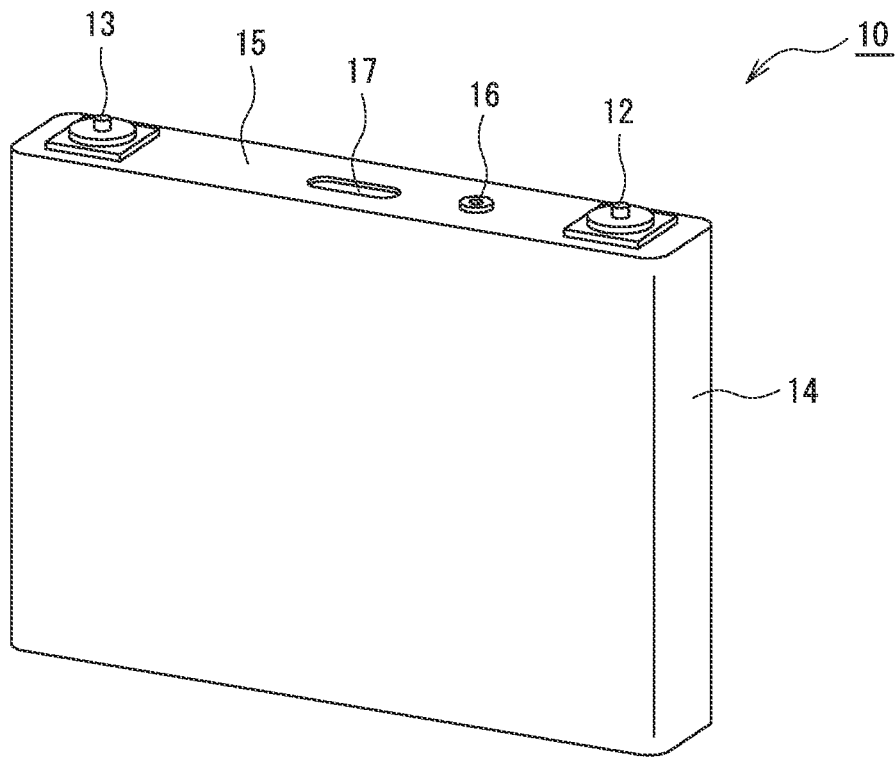
FIG. 1 is a perspective view illustrating an appearance of an electrical storage device, which is an example of an embodiment.
Figure 2:
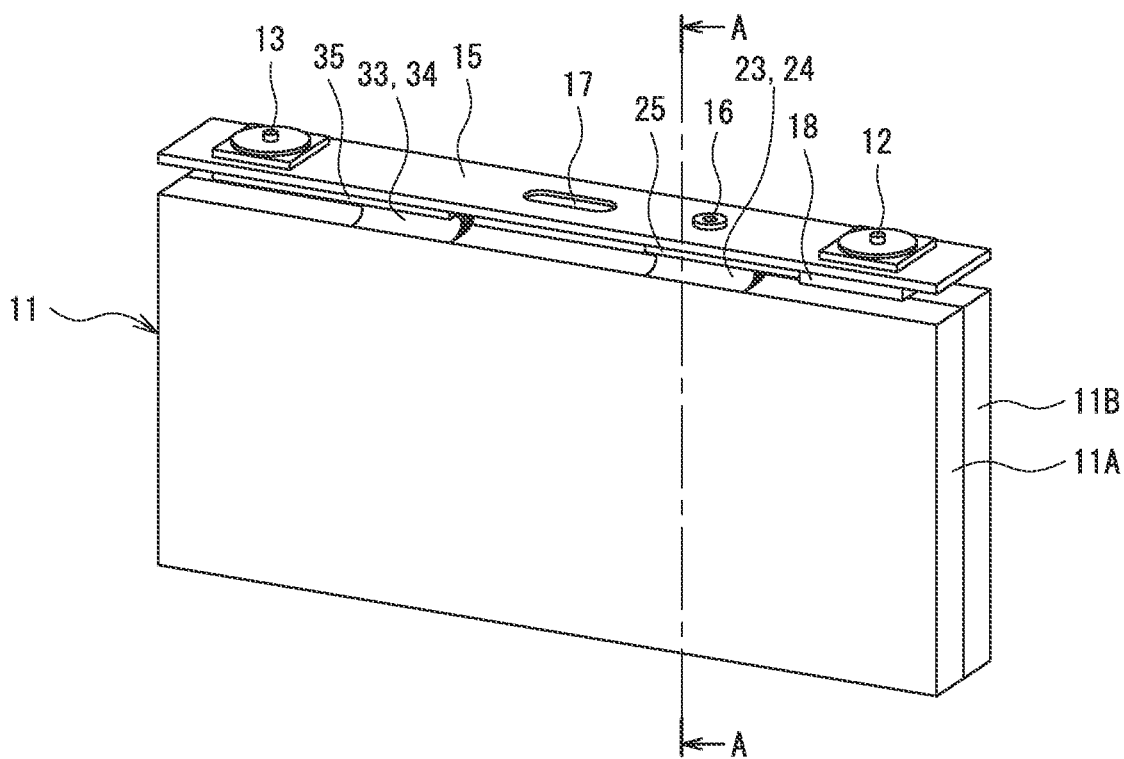
FIG. 2 is a perspective view of an electrode assembly and a sealing plate, which are an example of an embodiment.

FIG. 1 is a perspective view illustrating an appearance of a secondary battery 10, which is an example of an embodiment, and FIG. 2 is a perspective view of an electrode assembly 11 and a sealing plate 15 forming the secondary battery 10 (a view illustrating a state in which an outer can 14 is removed). The secondary battery 10 illustrated in FIG. 1 comprises, as an outer body, a rectangular container including the outer can 14 and the sealing plate 15, but the outer body is not limited thereto. Note that the electrical storage device according to the present disclosure is not limited to the secondary battery 10, and may be, for example, a primary battery or a capacitor.

As illustrated in FIGS. 1 and 2, the secondary battery 10 comprises an electrode assembly 11, an electrolyte, a bottomed cylindrical outer can 14 in which the electrode assembly 11 and the electrolyte are housed, and the sealing plate 15 to which a positive electrode terminal 12 and a negative electrode terminal 13 are attached and that closes an opening of the outer can 14. The electrode assembly 11 has a structure in which positive electrodes 20 and negative electrodes 30 are alternately stacked with separators 40 each interposed therebetween (for details, see FIG. 3 described later). The outer can 14 is a metal rectangular container having a flat and substantially rectangular parallelepiped shape, which is open on one side in an axial direction, and the secondary battery 10 is a so-called rectangular battery. Each of the outer can 14 and the sealing plate 15 is made of a metal material containing aluminum as a main component, for example.

In the following description, the height direction of the outer can 14 is referred to as an "up-down direction" of the secondary battery 10, the sealing plate 15 side is referred to as "upper," and the bottom portion side of the outer can 14 is referred to as "lower," for convenience of description. The direction along a longitudinal direction of the sealing plate 15 is referred to as a "lateral direction" of the secondary battery 10.

The electrolyte may be an aqueous electrolyte, but preferably be a non-aqueous electrolyte. The non-aqueous electrolyte may be a solid electrolyte, but in the present embodiment, a non-aqueous electrolyte solution is used as the non-aqueous electrolyte. The non-aqueous electrolyte solution contains a non-aqueous solvent, and an electrolyte salt dissolved in the non-aqueous solvent, for example. As the non-aqueous solvent, for example, esters, ethers, nitriles, amids, or a mixed solvent containing at least two of those mentioned above may be used. The non-aqueous solvent may also contain a halogen substitute in which at least a part of hydrogens of these solvents is substituted with a halogen atom. As the electrolyte salt, for example, a lithium salt such as $LiPF_6$ is used.

A positive electrode terminal 12 and a negative electrode terminal 13 are attached to the sealing plate 15, as described above. The sealing plate 15 has an elongated rectangular shape, and the positive electrode terminal 12 and the negative electrode terminal 13 are arranged at one end side and at the other end side in the longitudinal direction of the sealing plate 15, respectively. The positive electrode terminal 12 and the negative electrode terminal 13 are external connection terminals to be electrically connected to another secondary battery 10 or a load, and are attached to the sealing plate 15 via an insulating member.

Although details will be described later, the positive electrode 20 includes a positive electrode tab 23 to be electrically connected with the positive electrode terminal 12, and the negative electrode 30 includes a negative electrode tab 33 to be electrically connected with the negative electrode terminal 13. The positive electrode terminal 12 is electrically connected with a positive electrode tab group 24 formed by stacking a plurality of positive electrode tabs 23 via a positive electrode current collecting plate 25, and the negative electrode terminal 13 is electrically connected with a negative electrode tab group 34 formed by stacking a plurality of negative electrode tabs 33 via a negative electrode current collecting plate 35.

The sealing plate 15 is provided with a current breaking device 18, as a functional component, for cutting off a current path when the abnormality occurs in the battery. The functional component is, for example, a component functioning as a safety device or a control device of the secondary battery 10. The functional component is arranged close to the positive electrode terminal 12 or the negative electrode terminal 13 on the inner surface of the sealing plate 15. In the present embodiment, the current breaking device 18 is accompanied with and arranged inside the positive electrode terminal 12.

The current breaking device 18 is a pressure-responsive safety device that breaks a current path in the case where the internal pressure in the outer can 14 increases beyond a predetermined pressure due to an abnormality occurring in the secondary battery 10. For example, the current breaking device 18 is arranged between the positive electrode terminal 12 and the positive electrode current collecting plate 25, and is electrically connected to the positive electrode terminal 12 and the positive electrode current collecting plate 25 in normal use. The structure of the current breaking device 18 is not limited to a particular structure, but as an example of the current breaking device 18, there is a device including an inversion plate that is inverted in a direction away from the positive electrode current collecting plate 25 when the internal pressure increases, to cut off the electrical connection with the positive electrode current collecting plate 25 and break the current path between the positive electrode terminal 12 and the positive electrode current collecting plate 25.

The sealing plate 15 is provided with a liquid injection portion 16 for injecting the non-aqueous electrolyte solution, and a gas discharge vent 17 that opens to discharge gas when an abnormality occurs in the battery. The gas discharge vent 17 is arranged in a center portion in the longitudinal direction of the sealing plate 15, and the liquid injection portion 16 is arranged between the positive electrode terminal 12 and the gas discharge vent 17.

As illustrated in FIG. 2, the electrode assembly 11 is divided into a first electrode group 11A and a second electrode group 11B. The electrode groups 11A and 11B have the same stacking structure and dimensions, and are stacked in a thickness direction of the electrode assembly 11, for example. The positive electrode tab group 24 consisting of a plurality of positive electrode tabs 23 and the negative electrode tab group 34 consisting of a plurality of negative electrode tabs 33 are formed on the upper end portion of each electrode group, and are connected to the respective current collecting plates of the sealing plate 15. Outer circumferential surfaces of the electrode groups 11A and 11B are covered by the separator 40, and the battery reaction occurs independently in the electrode groups 11A and 11B.

Figure 3:
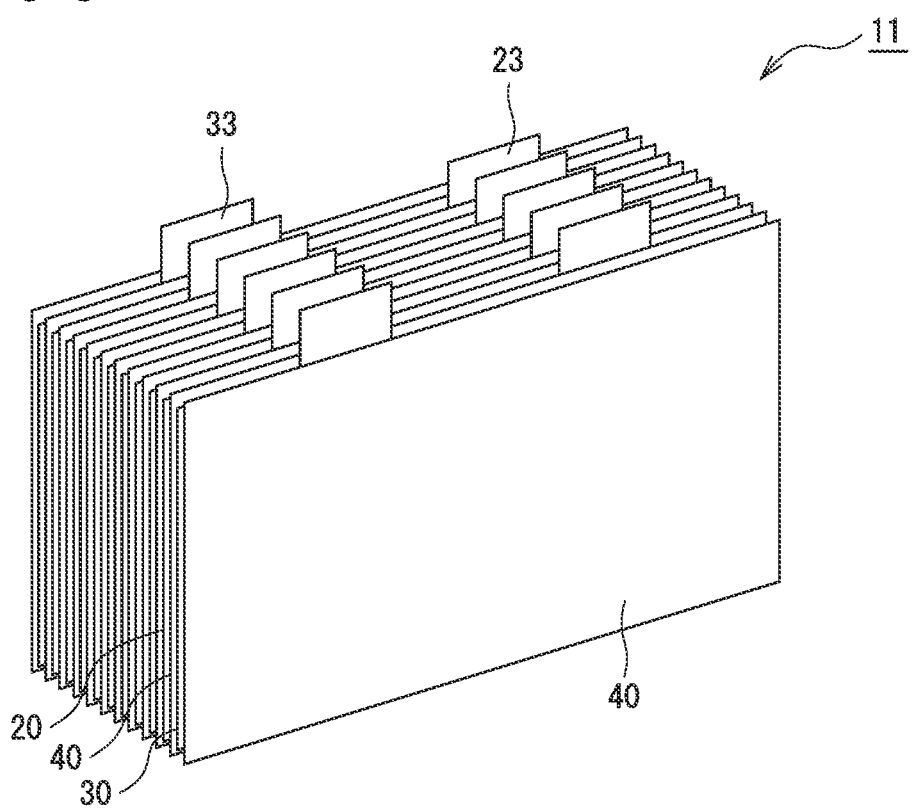
FIG. 3 is an exploded perspective view of the electrode assembly, which is an example of an embodiment.

FIG. 3 is an exploded perspective view of the electrode assembly 11. As illustrated in FIG. 3, the electrode assembly 11 includes a plurality of positive electrodes 20 and a plurality of negative electrodes 30. For example, in each of the electrode groups 11A and 11B forming the electrode assembly 11, the number of negative electrodes 30 is greater than the number of positive electrodes 20 by one, so that the negative electrodes 30 are provided at both ends in the thickness direction of the electrode groups 11A and 11B. FIG. 3 illustrates that a plurality of separators 40 are arranged one by one between the positive electrodes 20 and the negative electrodes 30, but the number of separators 40 included in each of the electrode groups 11A and 11B may be one. In this case, the long separator 40 is folded in a zigzag shape and is arranged between the positive electrodes 20 and the negative electrodes 30.

The electrode assembly 11 is a stack-type electrode assembly in which a plurality of positive electrodes 20 and a plurality of negative electrodes 30 are alternately stacked, one by one, with separators each interposed therebetween. The positive electrode 20 includes the positive electrode tab 23 projecting upward, and the negative electrode 30 includes the negative electrode tab 33 projecting upward. In other words, the positive electrodes 20 and the negative electrodes 30 are stacked so that the respective tabs are directed in the same direction. The positive electrodes 20 and the negative electrodes 30 are stacked so that the positive electrode tab 23 and the negative electrode tab 33 are positioned at one end side and at the other end side in the lateral direction of the electrode assembly 11, respectively, and a plurality of positive electrode tabs 23 are aligned in the thickness direction of the electrode assembly 11 and a plurality of negative electrode tabs 33 are aligned in the thickness direction of the electrode assembly 11.

The positive electrode 20 has a positive electrode core 21 and a positive electrode mixture layer formed on a surface of the positive electrode core 21. Examples of the positive electrode core 21 include a foil of a metal that is stable in a potential range of the positive electrode 20, such as aluminum or an aluminum alloy, and a film in which such a metal is provided on the surface layer. The positive electrode mixture layer contains a positive electrode active material, a conductive agent, and a binder, and is preferably provided on each side of the positive electrode core 21. The positive electrode 20 can be fabricated by, for example, applying a positive electrode mixture slurry containing a positive electrode active material, a conductive agent, a binder, and the like on the positive electrode core 21, drying the resulting coating film, and then compressing it to form a positive electrode mixture layer on each side of the positive electrode core 21.

The positive electrode 20 has a structure in which the positive electrode mixture layer is formed on the entire region of a portion excluding the positive electrode tab 23 (hereinafter, referred to as a "base portion") in the surface of the positive electrode core 21. The thickness of the positive electrode core 21 is, for example, 5 μm to 20 μm, and preferably 8 μm to 15 μm. The base portion of the positive electrode core 21 has a rectangle shape in front view, and the positive electrode tab 23 projects from a side of the rectangle. The positive electrode core 21 is generally obtained by processing one sheet of metal foil to integrally form the base portion and the positive electrode tab 23.

A lithium transition metal composite oxide is used as the positive electrode active material. Examples of a metal element contained in the lithium transition metal composite oxide include Ni, Co, Mn, Al, B, Mg, Ti, V, Cr, Fe, Cu, Zn, Ga. Sr, Zr, Nb, In, Sn, Ta, and W. In particular, at least one of Ni, Co, and Mn is preferably contained. Suitable examples of the composite oxide include a lithium transition metal composite oxide containing Ni, Co, and Mn, and a lithium transition metal composite oxide containing Ni, Co, and Al.

Examples of the conductive agent contained in the positive electrode mixture layer can include carbon materials such as carbon black, acetylene black, Ketjenblack, and graphite. Examples of the binder contained in the positive electrode mixture layer can include fluororesin such as polytetrafluoroethylene (PTFE) and polyvinylidene fluoride (PVdF), polyacrylonitrile (PAN), polyimide resins, acrylic resins, and polyolefin resins. Also, these resins may be used in combination with a cellulose derivative such as carboxymethyl cellulose (CMC) or a salt thereof, a polyethylene oxide (PEO), or the like.

The negative electrode 30 has a negative electrode core 31 and a negative electrode mixture layer formed on the surface of the negative electrode core 31. Examples of the negative electrode core 31 include a foil of a metal that is stable in a potential range of the negative electrode 30, such as copper, and a film in which such a metal is provided on the surface layer. The negative electrode mixture layer contains a negative electrode active material and a binder, and is preferably formed on each side of the negative electrode core. The negative electrode 30 can be fabricated by, for example, applying a negative electrode mixture slurry containing a negative electrode active material, a binder, and the like on a surface of the negative electrode core 31, drying the resulting coating film, and then compressing it to form a negative electrode mixture layer on each side of the negative electrode core 31.

The negative electrode 30 has a structure in which the negative electrode mixture layer is formed on the entire region of a base portion which is a portion excluding the negative electrode tab 33 in the surface of the negative electrode core 31. The thickness of the negative electrode core 31 is, for example, 3 μm to 15 μm, and preferably 5 μm to 10 μm. The base portion of the negative electrode core 31 has a rectangle shape in front view, and the negative electrode tab 33 projects from a side of the rectangle in the same manner as in the case of the positive electrode 20. The negative electrode core 31 is generally obtained by processing one sheet of metal foil to integrally form the base portion and the negative electrode tab 33.

For example, a carbon-based active material that reversibly occludes and releases lithium ions is used as the negative electrode active material. A preferable carbon-based active material is graphite including natural graphite such as flake graphite, massive graphite, and earthy graphite, and artificial graphite such as massive artificial graphite (MAG) and graphitized mesophase carbon microbeads (MCMB). As the negative electrode active material, a Si-based active material that is comprised of at least one of Si and a Si-containing compound may be used, and a carbon-based active material and a Si-based active material may be used in combination.

As the binder contained in the negative electrode mixture layer, a fluororesin, PAN, a polyimide, an acrylic resin, and a polyolefin, or the like may be used in the same manner as in the case of the positive electrode 20, and a styrene-butadiene rubber (SBR) is preferably used. Preferably, the negative electrode mixture layer may further contain CMC or a salt thereof, polyacrylic acid (PAA) or a salt thereof, polyvinyl alcohol (PVA), or the like. In particular, SBR may be preferably used in combination with CMC or a salt thereof, or PAA or a salt thereof.

Figure 4:
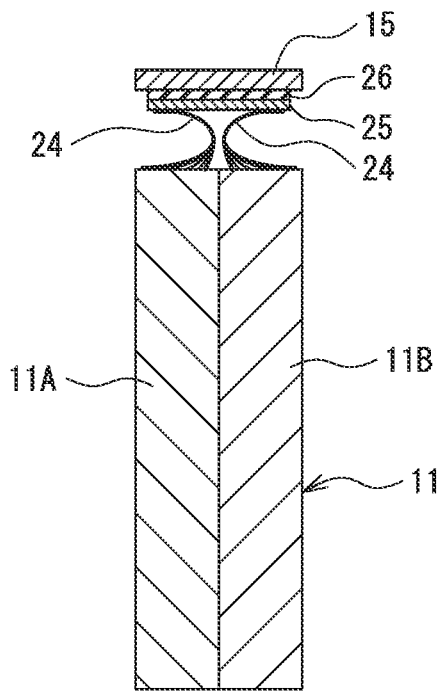
FIG. 4 is a sectional view of the electrode assembly, which is an example of an embodiment.

FIG. 4 is a view schematically illustrating a cross section taken along a line AA in FIG. 2. Hereinafter, a configuration of the positive electrode tab group 24 and the negative electrode tab group 34 for the electrode assembly 11 will be described in detail with reference to FIGS. 2 and 4.

As illustrated in FIGS. 2 and 4, the electrode assembly 11 includes the positive electrode tab groups 24 each formed by stacking a plurality of positive electrode tabs 23 and the negative electrode tab groups 34 each formed by stacking a plurality of negative electrode tabs 33. One positive electrode tab group 24 in which the plurality of positive electrode tabs 23 are superposed in the stacking direction of the electrodes is formed in each of the electrode groups 11A and JI B. Similarly, one negative electrode tab group 34 in which the plurality of negative electrode tabs 33 are superposed in the stacking direction of the electrodes is formed in each of the electrode groups 11A and 11B.

The positive electrode tab groups 24 are joined, by welding or the like, to the positive electrode current collecting plate 25 attached to the inner surface (lower surface) of the sealing plate 15. The positive electrode current collecting plate 25 is a plate-shaped conductive member to be electrically connected with the positive electrode terminal 12 via the current breaking device 18, as described above. An insulating member 26 is interposed between the sealing plate 15 and the positive electrode current collecting plate 25 to prevent a contact between both members. Similarly, the negative electrode tab groups 34 are joined, by welding or the like, to the negative electrode current collecting plate 35 attached to the inner surface of the sealing plate 15 via an insulating member.

The positive electrode tab groups 24 and the negative electrode tab groups 34 function as springs for connecting the electrode assembly 11 and the sealing plate 15. The positive electrode tab groups 24 and the negative electrode tab groups 34 are configured to be expandable and contractible in the up-down direction, and for example, the sealing plate 15 is pushed back upward in the case where the sealing plate 15 is pressed from above to reduce spacing between the sealing plate 15 and the electrode assembly 11 (a portion other than the tab groups). That is, the positive electrode tab groups 24 and the negative electrode tab groups 34 are elastically deformed, whereby the spacing between the electrode assembly 11 and the sealing plate 15 is maintained.

The positive electrode tab groups 24 and the negative electrode tab groups 34 may have any shape such that they can function as conductive paths connecting the electrode assembly 11 and the corresponding terminal and as the above-described springs. In an example illustrated in FIGS. 2 and 4, the plurality of positive electrode tabs 23 and the plurality of negative electrode tabs 33 of the electrode group 11A are separately stacked in a state of being curved from outside to inside of the secondary battery 10, so that each of the positive electrode tab group 24 and the negative electrode tab group 34 is formed to have a substantial U shape in sectional view. Similarly, the tab groups each having a substantial U shape in sectional view are also formed in the electrode group 11B. Note that each tab group may have a U shape formed by being curved from inside to outside of the secondary battery 10. Then, the tab groups of the two stacked electrode groups as illustrated in FIG. 4 may be arranged so that the cross sectional shape of the tab group of one electrode group and the cross sectional shape of the tab group of the other electrode group are substantially symmetrical about a boundary between the electrode groups.

The positive electrode tab groups 24 may be welded to the upper surface of the positive electrode current collecting plate 25 which faces the sealing plate 15 side, but preferably are welded to the lower surface of the positive electrode current collecting plate 25. When the positive electrode tab groups 24 are welded to the lower surface of the positive electrode current collecting plate 25, the function of the spring is more easily exerted. In the present embodiment, all of the positive electrode tab groups 24 and the negative electrode tab groups 34 are welded to the lower surfaces of the respective current collecting plates, but the positive electrode tab groups 24 may be welded to the lower surface of the positive electrode current collecting plate 25 and the negative electrode tab groups 34 may be welded to the upper surface of the negative electrode current collecting plate 35, for example.

In the secondary battery 10, the spring constant of one tab group close to the functional component, of the positive electrode tab group 24 and the negative electrode tab group 34 is greater than a spring constant of the other tab group. In the present embodiment, the current breaking device 18 accompanied with the positive electrode terminal 12 is provided as the functional component, and the spring constant Kt of the positive electrode tab group 24 arranged close to the current breaking device 18 is greater than the spring constant Kb of the negative electrode tab group 34 that is away from the current breaking device 18. That is, the positive electrode tab group 24 has higher rigidity than that of the negative electrode tab group 34, and makes it harder to expand and contract than the negative electrode tab group 34.

When the spring constants of the positive electrode tab group 24 and the negative electrode tab group 34 are set to satisfy Kt>Kb, the negative electrode tab group 34 is deformed more easily than the positive electrode tab group 24 when a force of pressing the sealing plate 15 from above acts or a force of raising the electrode assembly 11 from below acts on the positive electrode tab group 24 and the negative electrode tab group 34 in the manufacture of the secondary battery 10, for example. That is, the negative electrode tab group 34 is preferentially deformed to absorb the force, which makes it hard to reduce the spacing between the electrode assembly 11 and the sealing plate 15 on the positive electrode terminal 12 side. This can prevent a contact between the electrode assembly 11 and the current breaking device 18, which prevents a great load from being applied to the current breaking device 18.

Each spring constant of the positive electrode tab group 24 and the negative electrode tab group 34 is calculated from a load applied to each tab group and a deformation amount of the tab group. A specific calculation method is as follows.

(1) The sealing plate 15 is cut off at the center in the longitudinal direction so that the sealing plate 15 is separated into the positive electrode terminal 12 side and the negative electrode terminal 13 side.

(2) A load is applied to the separated sealing plate 15 by an Autograph from directly above the positive electrode tab group 24 and from directly above the negative electrode tab group 34.

(3) Each of the spring constants Kt and Kb is calculated from the applied load and the deformation amount (contraction amount) of corresponding tab group when the load is applied.

The ratio of the spring constant Kt of the positive electrode tab group 24 to the spring constant Kb of the negative electrode tab group 34 (Kt/Kb) preferably satisfies the relationship of $2.5 \leq Kt/Kb \leq 7.5$. Setting Kt/Kb to 2.5 or more can easily prevent the current breaking device 18 from contacting the electrode assembly 11 when the electrode assembly 11 welded to the sealing plate 15 is inserted into the outer can 14 in the step of manufacturing the secondary battery 10. Meanwhile, when Kt/Kb is set to 7.5 or less, it is not necessary to adopt the structure such that the rigidity of the positive electrode tab group 24 can be greatly increased or it is not necessary to adopt the structure such that the rigidity of the negative electrode tab group 34 can be greatly reduced. Therefore, the damage of the current breaking device 18 can be prevented efficiently.

The spring constant Kt of the positive electrode tab group 24 is, for example, 2.5 to 10 N/mm, preferably 3 to 8 N/mm, and more preferably 4 to 6 N/mm. On the other hand, the spring constant Kb of the negative electrode tab group 34 is, for example, 0.5 to 2.5 N/mm, preferably 0.6 to 2 N/mm, and more preferably 0.7 to 1.5 N/mm. As an example of a preferable combination of the spring constants Kt and Kb, Kt is 4 to 6 N/mm, Kb is 0.7 to 1.5 N/mm, and Kt/Kb is 3 to 5.

The spring constants Kt and Kb of the positive electrode tab group 24 and the negative electrode tab group 34 can be changed depending on constituent materials, thicknesses and widths of the positive electrode tab 23 and the negative electrode tab 33, and the number of stacked tabs forming the tab group. Since the constituent material and thickness of each tab are generally restricted from viewpoint of the battery performance, the width of each tab is preferably adjusted to control the spring constants Kt and Kb to be within the above-described respective ranges. When the width of the positive electrode tab 23 is increased and the width of the negative electrode tab 33 is reduced, Kt/Kb can be increased. Alternatively, the plurality of negative electrode tabs 33 forming the negative electrode tab group 34 are divided into two groups, and one group having shorter length is welded to the intermediate portion of the other group, that is, only the negative electrode tabs 33 in the other group are welded to the negative electrode current collecting plate 35, so that the spring constant Kb of the negative electrode tab group 34 can be reduced.

Figure 5:
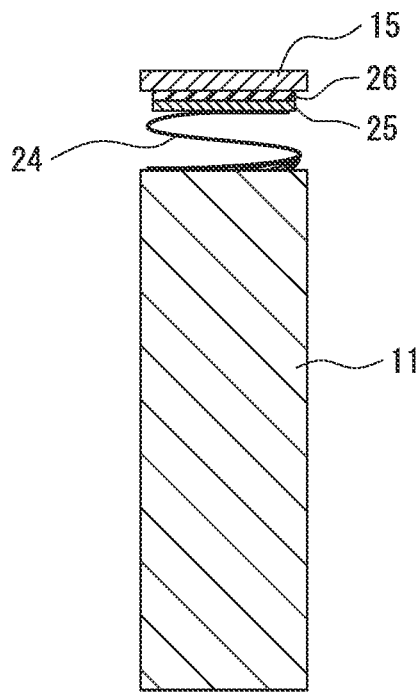
FIG. 5 is a sectional view of an electrode assembly, which is another example of an embodiment.

FIG. 5 is a view illustrating a modified example of the electrode assembly 11. As illustrated in FIG. 5, the spring constant Kt can be changed also by folding back the positive electrode tab group 24 a plurality of times. The positive electrode tab group 24 is folded in a zigzag shape to form a plurality (two in an example illustrated in FIG. 5) of folded-back portions, for example. The zigzag shape may be applied to only the positive electrode tab group 24, only the negative electrode tab group 34, or both tab groups. For example, the zigzag shape may be applied to the positive electrode tab group 24, and the U shape illustrated in FIG. 4 may be applied to the negative electrode tab group 34. The zigzag shape illustrated in FIG. 5 may be applied to the tab group of each electrode group even when a plurality of electrode groups are stacked as illustrated in FIG. 4. At this time, as described above, the tab groups may be arranged so that the cross sectional shape of the tab group of one electrode group and the cross sectional shape of the tab group of the other electrode group are substantially symmetrical about a boundary between the electrode groups. In this way, the spring constants Kt and Kb can be changed also by designing the shape of each tab group.

In the example illustrated in FIG. 5, the electrode assembly 11 is formed of one electrode group without being divided into a plurality of electrode groups. Meanwhile, the plurality of positive electrode tabs 23 may be divided into two groups at the center in the thickness direction of the electrode assembly 11, so that two positive electrode tab groups 24 can be formed. The numbers of tab groups may be different between the positive electrode tab groups 24 and the negative electrode tab groups 34, and for example, the number of positive electrode tab groups 24 and the number of negative electrode tab groups 34 may be one and plural, respectively, or the number of negative electrode tab groups 34 and the number of positive electrode tab groups 24 may be one and plural, respectively.

As described above, the secondary battery 10 in which the spring constants Kt and Kb of the positive electrode tab group 24 and the negative electrode tab group 34 satisfy the relationship of Kt>Kb, preferably 2.5≤Kt/Kb≤7.5 can prevent a great load from being applied to the current breaking device 18 while ensuring good productivity. The negative electrode tab group 34 is preferentially deformed to absorb the load even when the vibration or the impact is applied to the electrode assembly 11 or the sealing plate 15 when the electrode assembly welded to the sealing plate 15 is inserted into the outer can 14 in the step of manufacturing the secondary battery 10, for example. This can prevent the current breaking device 18 from contacting the electrode assembly 11. According to the secondary battery 10, the current breaking device 18 can be sufficiently protected from the vibration or the impact even when special manufacturing conditions are not added in an assembling step or the like.

A design of the embodiment described above may be appropriately changed without impairing the object of the present disclosure. For example, in the above-described embodiment, the current breaking device 18 is illustrated as an example of the functional component, but the functional component may be a current fuse or protection circuit board for protecting a battery from overcurrent, a container (tank, capsule) configured to store agents for suppressing overheating of the battery, or the like.

The functional component may be arranged close to the negative electrode terminal 13, and the same effect as the above-described configuration in which the functional component is arranged close to the positive electrode terminal 12 can be obtained. In this case, the spring constant Kb of the negative electrode tab group needs to be greater than the spring constant Kt of the positive electrode tab group. At this time, the ratio of the spring constant Kb of the negative electrode tab group 34 to the spring constant Kt of the positive electrode tab group 24 (Kb/Kt) preferably satisfies the relationship of 2.5≤Kb/Kt≤7.5. The spring constant Kt of the positive electrode tab group 24 is, for example, 0.5 to 2.5 N/mm, preferably 0.6 to 2 N/mm, and more preferably 0.7 to 1.5 N/mm. On the other hand, the spring constant Kb of the negative electrode tab group 34 is, for example, 2.5 to 10 N/mm, preferably 3 to 8 N/mm, and more preferably 4 to 6 N/mm. As an example of a preferable combination of the spring constants Kt and Kb, Kt is 0.7 to 1.5 N/mm, Kb is 4 to 6 N/mm, and Kb/Kt is 3 to 5.

That is, when the spring constant of one tab group close to the functional component is represented as K, and the spring constant of the other tab group is represented as k, the above-described effect can be obtained by satisfying K>k. At this time, the ratio (K/k) of the spring constant K of the one tab group to the spring constant k of the other tab group is 2.5≤K/k≤7.5, and preferably 3≤K/k≤5.

REFERENCE SIGNS LIST

10 Secondary battery
11 Electrode assembly
11A First electrode group 11B Second electrode group
12 Positive electrode terminal
13 Negative electrode terminal
14 Outer can
15 Sealing plate
16 Liquid injection portion
17 Gas discharge vent
18 Current breaking device
20 Positive electrode
21 Positive electrode core
22 Positive electrode mixture layer
23 Positive electrode tab
24 Positive electrode tab group
25 Positive electrode current collecting plate
26 Insulating member
30 Negative electrode
31 Negative electrode core
32 Negative electrode mixture layer
33 Negative electrode tab
34 Negative electrode tab group
35 Negative electrode current collecting plate
40 Separator

The invention claimed is:

1. An electrical storage device, comprising:
an electrode assembly in which positive electrodes and negative electrodes are alternately stacked with respective separators interposed between the positive electrodes and the negative electrodes;
a bottomed cylindrical outer can in which the electrode assembly is housed;
a sealing plate to which a positive electrode terminal and a negative electrode terminal are attached and that closes an opening of the outer can; and
a current breaking mechanism that is arranged closer to (1) the positive electrode terminal than the negative electrode terminal or (2) the negative electrode terminal than the positive electrode terminal on an inner surface of the sealing plate, wherein
the positive electrodes each include a respective positive electrode tab to be electrically connected with the positive electrode terminal,
the negative electrodes each include a respective negative electrode tab to be electrically connected with the negative electrode terminal,
the electrode assembly has a positive electrode tab group formed by stacking a plurality of the positive electrode tabs, and a negative electrode tab group formed by stacking a plurality of the negative electrode tabs, in which each of the tab groups functions as a spring for connecting the electrode assembly and the sealing plate,
among the positive tab group and the negative tab group, one tab group that is closer to the current breaking mechanism than the other tab group has a first spring constant greater than a second spring constant of the other tab group, and
a ratio (K/k) of the first spring constant K of the one tab group to the second spring constant k of the other tab group satisfies a relationship of $2.5 \leq K/k \leq 7.5$.

2. The electrical storage device according to claim 1, wherein
the current breaking mechanism is arranged closer to the positive electrode terminal than the negative electrode terminal, and
the first spring constant of the positive electrode tab group is greater than the second spring constant of the negative electrode tab group.

3. The electrical storage device according to claim 1, wherein
the electrode assembly is divided into first and second electrode groups that are arranged to be stacked,
each of the first and the second electrode groups has the positive electrode tab group and the negative electrode tab group.

4. The electrical storage device according to claim 1, further comprising:
a positive electrode current collecting plate comprising an upper surface facing the sealing plate and a lower surface facing a bottom of the outer can; and
a negative electrode current collecting plate comprising an upper surface facing the sealing plate and a lower surface facing a bottom of the outer can, wherein
the positive tab group is joined to the lower surface of the positive current collecting plate, and
the negative tab group is joined to the lower surface of the negative current collecting plate.

5. The electrical storage device according to claim 1, wherein the one tab group is bent in a concave U-shape from one side of the electrode assembly toward the opposite side of the electrode assembly facing the one side.

6. The electrical storage device according to claim 1, wherein the one tab group is bent in a zigzag shape from one side of the electrode assembly toward the opposite side of the electrode assembly facing the one side.

* * * * *